United States Patent Office 3,452,556
Patented July 1, 1969

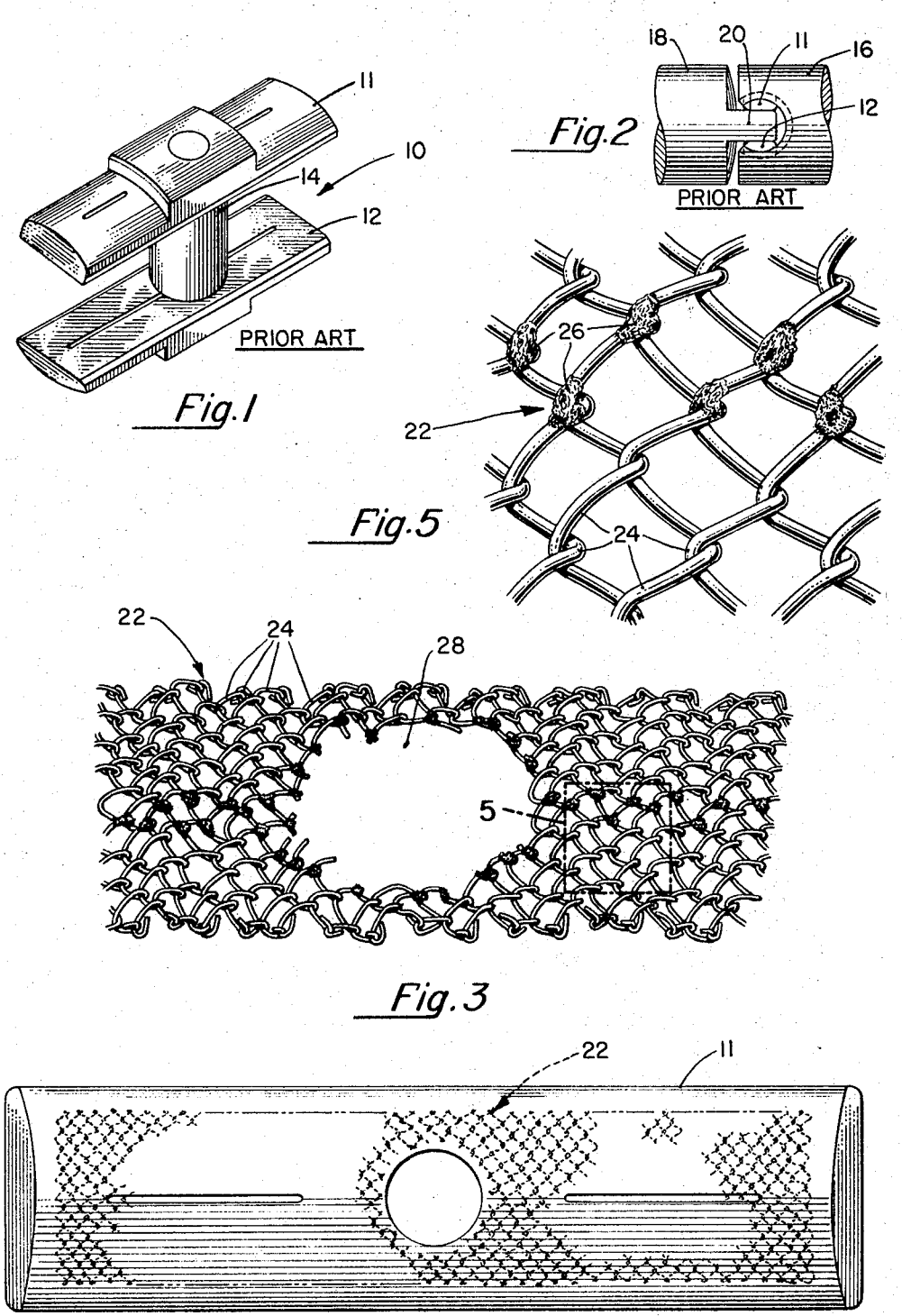
July 1, 1969     S. C. EINHORN     3,452,556
REINFORCED CAST NYLON SLIPPER BEARINGS FOR UNIVERSAL JOINTS
Filed Nov. 30, 1967
INVENTOR
STANLEY C. EINHORN
ATTORNEY

3,452,556
REINFORCED CAST NYLON SLIPPER BEARINGS FOR UNIVERSAL JOINTS
Stanley C. Einhorn, Newark, Del., assignor to The Budd Company, Philadelphia, Pa., a corporation of Pennsylvania
Filed Nov. 30, 1967, Ser. No. 686,892
Int. Cl. F16d *3/76;* F16c *27/06, 11/08*
U.S. Cl. 64—7                                         7 Claims

ABSTRACT OF THE DISCLOSURE

A cast nylon object includes a reinforcement member constructed of a plurality of coiled interwoven wire elements. The member is cast with the nylon object during manufacture and expands and contracts with the nylon.

---

A preferred embodiment of the invention is a cast nylon slipper bearing such as may be employed in a universal joint driving connection or coupling between a spindle and a roll in a steel rolling mill, for example. Such universal joints provide for relative pivoted movement of the two connected members about two intersecting axes disposed at right angles to each other. It also provides for separation of the two members upon relative axial movement thereof.

The use of cast nylon as a slipper bearing material is well known and its advantages understood. In general, such nylon bearings are more silent in operation, are of greater durability and provide a good low friction material. A disadvantage of the use of nylon bearings alone is that they tend to break down under the pounding to which they are generally subjected in a steel mill operation. More particularly, they tend to rupture at the centers which are constantly flexed as a result of the strain placed on the center of the bearings by connecting pins.

In the past, metal reinforcements have been employed to prevent detrimental shattering or like disintegration of slipper bearings during operation. Patents 2,361,629 and 2,460,361 disclose and describe slipper bearings having metal inserts therein, for example.

While inserts of the type described in the aforementioned patents could be incorporated into anionically polymerized thermo-plastic nylon slipper bearings, such incorporation would impose much if not unsurmountable difficulty in the finish machining steps.

In the conversion of lactams to crystalline cast nylon by anionic polymerization there is experienced a 10% to 15% volume loss. Further, anionic polymerization is performed best at temperatures ranging from 280° F. to 350° F. The thermo coefficient of expansion of nylon is about ten times as that of most metals.

The decrease of dimension due to volume loss and thermal shrinkage of nylon are so much greater than those of rigid metal inserts that severe warping occurs and large internal stresses would be built in the finished nylon products with such rigid inserts. These stresses cannot be relieved by known methods of annealing. Hence, even finish machining to desired dimensional specifications is virtually impossible. Every cut redistributes built-in stresses and causes the warpage to change. These difficulties would be encountered with any rigid structure made up of metallic bars of standard geometric cross-sectional shapes such as round, rectangular, triangular, etc.

It is an object of this invention to provide an improved reinforced cast nylon body.

It is a further object of this invention to provide a slipper bearing made of cast nylon with improved reinforcement means.

It is still a further object of this invention to provide an insert for a cast nylon bearing that is flexible, will minimize internal stresses and warpage, permit an acceptable degree of annealing and a maximum ability to keep the casting together and serviceable after fracture in service.

It is still a further object of this invention to provide a reinforcing insert for a cast nylon bearing which can be used to straddle the neutral stress plane in the casting and give a high likelihood of a warpage-free casting.

In accordance with the present invention, a slipper bearing comprises a main nylon body. A plurality of coiled members are interwoven and bound together by suitable means. The spring member is capable of yielding in different directions to conform with expansion and contraction of the nylon material during manufacture.

Other objects and advantages of the present invention will be apparent and suggest themselves to those skilled in the art, from a reading of the following specification and claims, in conjunction with the accompanying drawings, in which:

FIG. 1 illustrates a pair of slipper bearings as used in a conventional manner;

FIG. 2 illustrates the use of the slipper bearings in a conventional system;

FIG. 3 is a top view of a coiled spring member used for reinforcement, in accordance with the present invention;

FIG. 4 is a top view of a slipper bearing illustrating the reinforcement member embedded therein, and FIG. 5 is an enlarged view of a portion of the spring member illustrated in FIG. 3.

Referring particularly to FIGS. 1 and 2, a slipper bearing assembly 10 includes a pair of slipper bearings 11 and 12 suitably mounted to a pin 14. Shafts 16 and 18 indicate respectively the male and female elements of a universal joint embodying a slipper bearing constructed in accordance with this invention. The element 18 has formed therein adjacent its end a bore the central portion of which is preferably enlarged. This bore communicates with a notch in the outer end of the female element through which prongs 20 of the element 18 extend for engagement with the center pin 14 with which the bearings 11 and 12 are engaged. In practice the element 18 may be connected to a roller in a steel mill and the element 16 may be connected to a driving means such as a motor. The arrangement illustrated in FIGS. 1 and 2 is conventional. It is therefore not described or shown in specific detail since such details are only incidental to the subject invention.

Referring to FIGS. 3, 4 and 5 of the drawings a reinforcement member 22 in accordance with the subject invention is illustrated. The reinforcement member comprises a coiled wire product, such as for example those manufactured by the Cambridge Wire Cloth Co., under the names "Balanced Belting" and "Conventional Belting." The element 22 may be considered as comprising a plurality of individual strands of wire capable of expanding or contracting in all directions, i.e. vertically, laterally, longitudinally and diagonally. The individual strands are interwoven and connected together in a suitable manner, such as by welding.

The reinforcement member 22 may be considered as comprising individual wire spiral wound strands 24. These wire wound strands are interwoven with each other. In order to permit handling each strand is welded at one position to an adjacent strand by means of weld joints 26 (FIG. 5). The strands of wire are arranged in a zig-zag manner in the manner illustrated. This permits more efficient straddling of the neutral stress axis of a nylon casting. It also permits much better coverage of the body of the casting. The single weld per strand does not restrict the flexibility of the individual spirals but does provide sufficient unit rigidity to permit suspension and positioning in the mold.

In order to receive the pin 14, holes are generally drilled in the slipper bearings 11 and 12. To accommodate these holes a hole 28 is cut in the reinforcement member 22. The hole 28 is slightly larger than the diameter of the holes to be drilled in the nylon casting.

A typical reinforcement member or insert 22 may be prepared by providing strands of wire to produce a member 18 inches long by 6 inches wide. An 8 inch gage wire by a 7/8-inch mesh conventional belting may be used. The assembly of strands of wire may then be laid on a flat surface with each strand being welded to each neighboring strand at one joint near its mid-point. The hole 28 may be burned out with an oxy-acetylene torch, re-welding the cut strands and pickling and cleaning to avoid contamination of the casting. The insert 22 is then suspended in a slipper bearing mold in a proper position to be encapsulated by the cast nylon and to permit drilling of the pin hole through the insert hole without cutting any wire. Next the mold and insert assemblies are preheated to a temperature of 330° F., purged with nitrogen and charged with molten catalyzed and promoted caprolactam at a temperature of 280° F. In thirty minutes there results a solid nylon casting which can be removed readily from the mold. The molded piece is removed, strapped to a straightening fixture and put through a suitable annealing cycle depending on the size of the slipper bearing. Finally, finish machining is performed in standard equipment such as lathes, milling machines, boring machines and drill presses as required.

The catalyzed and promoted caprolactam can be prepared by any of many methods. In one example, dry caprolactam was reacted with 0.165% by weight of lithium hydride for two hours at 200° F., then reduced to 190° F. Another batch of dry caprolactam was prepared by dissolving it at 350° F. 0.43 by weight of triphenoxytriazine. One part of the former is mixed with three parts of the latter to make up the catalyzed, promoted mixture.

In another example of a typical bearing, an insert is prepared by obtaining a 24 inch length of 10 gage by 7/8-inch mesh wire conventional belting, laying on a suitable fixture to provide a zig-zag shape having 60 degree angles between the planes of each strand and welding one point near the midpoint of every strand to each neighboring strand. This latter insert may then be used to prepare a reinforced slipper bearing as noted in the previous example, except that a larger cross-section is provided to accommodate the greater thickness of the insert structure.

Because the structure 22 is flexible in all directions, it will expand or contract in accordance with the nylon with which it associated. Thus, during manufacturing when the nylon is contracted, the insert reinforcement 22 will also contract. At the same time, after the slipper bearings have been manufactured, the reinforcement member 22 is free to bend slightly to follow the movement of the nylon bearing.

If the nylon bearings fracture during operation, the broken pieces will be held to the reinforcement member 22. Because of this, the breakdown time of the machine with which the slipper bearings are used is minimized. If a cracking or fracturing of the slipper bearing occurs, the bearing may generally be replaced upon the next inspection of the machine.

While the present invention has been specifically described in connection with slipper bearings for use in universal joints and particularly in universal joints used in steel mill machines, it is apparent that the reinforcement means used with the nylon bearing may have other similar applications. Basically, the present invention has provided a strong reinforcement means which is capable of flexing and expanding and contracting in accordance with the nylon with which it is associated. This flexibility is achieved during the manufacturing as well as after the manufacturing.

What is claimed is:

1. A cast flexible bearing comprising a main body which has the characteristic of contracting during a casting operation, and a reinforcement member composed of coiled spring members disposed within said main body capable of contracting in accordance with the contraction of said main body.

2. The invention as set forth in claim 1 wherein said reinforcement member comprises a plurality of spiral wire strands interwoven with each other and said flexible bearing is made of nylon.

3. The invention as set forth in claim 1 wherein said reinforcement member is yieldable readily in all directions.

4. The invention as set forth in claim 2 wherein said plurality of strands of wire are welded to each other with only a single weld on each strand.

5. The invention as set forth in claim 4 wherein said reinforcement member is extended longitudinally throughout said main nylon body.

6. The invention as set for in claim 5 wherein said nylon bearing comprises a bearing in a universal joint mechanism.

7. The invention as set forth in claim 6 wherein two bearings having a central aperture are used with a connecting pin in said universal joint mechanism.

References Cited

UNITED STATES PATENTS

| | | | |
|---|---|---|---|
| 2,251,126 | 7/1941 | Gatke | 64—7 |
| 2,460,361 | 2/1949 | Petho | 64—7 |
| 2,702,730 | 2/1955 | Ivanoff et al. | 308—73 |
| 2,906,567 | 9/1959 | Runton et al. | 308—53 |

HALL C. COE, Primary Examiner.

U.S. Cl. X.R.

308—238